United States Patent [19]
Huang

[11] Patent Number: 5,722,168
[45] Date of Patent: Mar. 3, 1998

[54] SAW BLADE SECURING MECHANISM

[76] Inventor: Jung Hua Huang, No. 413, Section 1, Yuan Lu Road, Fu Hsing Hsiang, Chang Hua Hsien, Taiwan

[21] Appl. No.: 688,207

[22] Filed: Jul. 29, 1996

[51] Int. Cl.$^6$ ........................................ B26B 1/04
[52] U.S. Cl. ........................ 30/161; 30/160; 30/339; 30/517
[58] Field of Search .................. 30/160–161, 151–157, 30/321, 330, 339, 517, 519

[56] References Cited

U.S. PATENT DOCUMENTS 3,851,986  12/1974  Daughtry ...................... 30/156 X
4,730,394  3/1988   Sonner ......................... 30/160 X

FOREIGN PATENT DOCUMENTS 167981  3/1951  Australia ...................... 30/519

*Primary Examiner*—Douglas D. Watts
*Attorney, Agent, or Firm*—Charles E. Baxley, Esq.

[57] ABSTRACT

A saw includes a slot formed in one end of a handle. A saw blade is engaged in the slot and rotatably secured to the handle at a rod. The rod includes a projection of smaller size. The saw blade includes a groove of smaller size for engaging with the projection and includes an aperture for engaging with the rod so as to prevent the rod from disengaging from the saw blade when the rod is engaged in the aperture of the saw blade. The saw blade includes a number of notches for engaging with a latch so as to be adjusted to different angular position relative to the handle.

6 Claims, 4 Drawing Sheets

SAW BLADE SECURING MECHANISM

BACKGROUND OF THE INVENTION

1. Field of the Invention

The present invention relates to a saw, and more particularly to a saw blade securing mechanism.

2. Description of the Prior Art

Typical saws comprise a handle having a saw blade secured thereto or pivotally coupled thereto. However, the saw blade may be extended to a position in line with the handle only such that the saw may not be used for sawing an object directly supported on the ground. The object should be supported on an elevated table surface. In addition, the saw blade is normally solidly secured to the handle with fastening screws and may not be easily replaced with a brand new one.

The present invention has arisen to mitigate and/or obviate the afore-described disadvantages of the conventional saws.

SUMMARY OF THE INVENTION

The primary objective of the present invention is to provide a saw blade securing mechanism which allows the handle to be adjusted to different angular position relative to the saw blade.

The other objective of the present invention is to provide a saw blade securing mechanism which allows the saw blade to be easily replaced with a new one.

In accordance with one aspect of the invention, there is provided a saw comprising a handle including a first end having a slot formed therein and including an orifice formed therein and intersected with the slot, a rod rotatably engaged in the orifice of the handle and including a first end having a head formed thereon for engaging with the second fin and including a second end having at least one projection extended therefrom, the projection including a size smaller than that of the rod, a saw blade including a first end having a groove formed therein for engaging with the projection when the projection is engaged in the slot, the groove including a root portion, the saw blade including an aperture formed in the root portion of the groove for engaging with the rod when the rod is aligned with the aperture, the aperture including a size greater than that of the groove so as to prevent the rod from disengaging from the saw blade when the rod is engaged in the aperture of the saw blade, and means for securing the rod to the handle so as to retain the rod in the aperture of the saw blade and so as to allow the saw blade to be rotated relative to the rod.

The first end of the saw blade including a peripheral portion having at least two notches formed therein, the handle further includes a latch means provided therein for engaging with the notches so as to secure the saw blade relative to the handle and so as to allow the saw blade to be adjusted to different angular position relative to the handle.

The first end of the saw blade includes a depression formed therein opposite to the notches for engaging with the latch means so as to secure the saw blade relative to the handle when the saw blade is folded to engage with the handle.

The first end of the handle includes a pair of fins having the slot formed therebetween, the orifice is formed in a first of the fins, and a second of the fins includes an oblong hole formed therein for engaging with the projection so as to prevent the rod from rotating relative to the handle.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
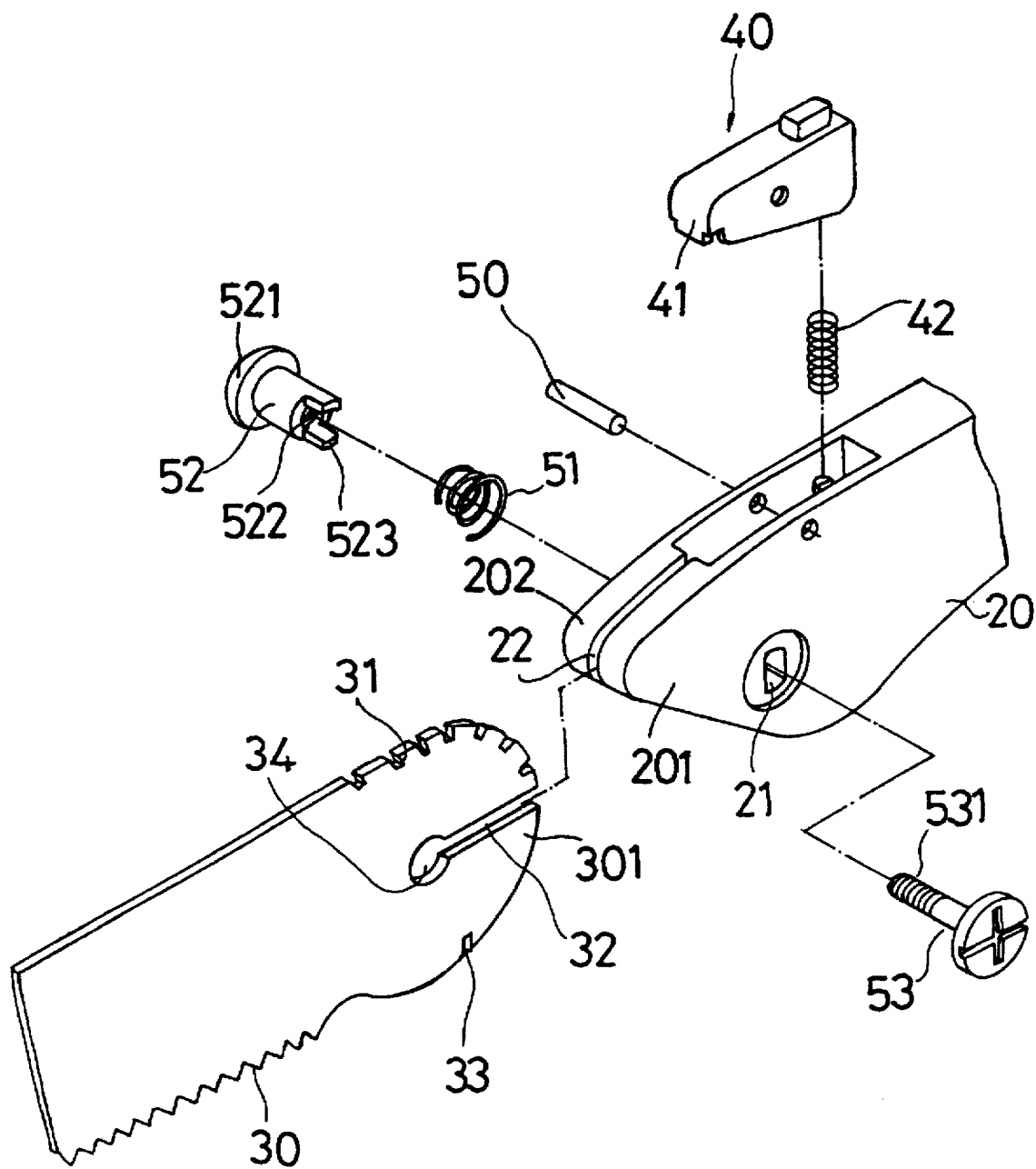
FIG. 1 is an exploded view of a saw.

Referring to the drawings, and initially to FIGS. 1 to 4, a saw blade securing mechanism in accordance with the present invention comprises a handle 20 including a slot 22 formed in one end for receiving a saw blade 30 and so as to form a pair of fins 201, 202. The fin 202 includes a circular orifice 203 (FIGS. 2 and 3) intersected with the slot 22 for rotatably receiving a rod 52 therein. The other fin 201 includes an oblong hole 21 formed therein. The rod 52 includes a head 521 formed thereon for engaging with the fin 202 and includes an inner thread 522 formed therein for engaging with an outer thread 531 of a bolt 53. The rod 52 includes a pair of projections 523 extended therefrom for engaging with the oblong hole 21 of the fin 201 so as to prevent the rod 52 from rotating relative to the handle 20. A spring 51 is engaged between the head 521 of the rod 52 and the fin 202 for biasing the head 521 of the rod 52 outward of the fin 202, best shown in FIGS. 2 and 3.

The saw blade 30 includes a longitudinal groove 32 extended in one end 301 thereof and includes an aperture 34 formed in the root portion of the groove 32 and communicating with the groove 32. The groove 32 includes a size smaller than the outer diameter of the rod 52 for engaging with the projections 523 and the bolt 53. The aperture 34 includes a diameter no less than that of the rod 52 for rotatably receiving the rod 52 therein. The end 301 includes a peripheral portion having a number of notches 31 and a depression 33 formed therein, in which the depression 33 is formed opposite to the notches 31. A knob 40 includes a center portion pivotally coupled to the handle 20 at a pin 50 and includes a latch 41 formed on one end for engaging with either of the notches 31 and depression 33. A spring 42 is engaged between the other end of the knob 40 and the handle 20 for biasing the latch 41 to engage with either of the notches 31 and depression 33.

Figure 4:
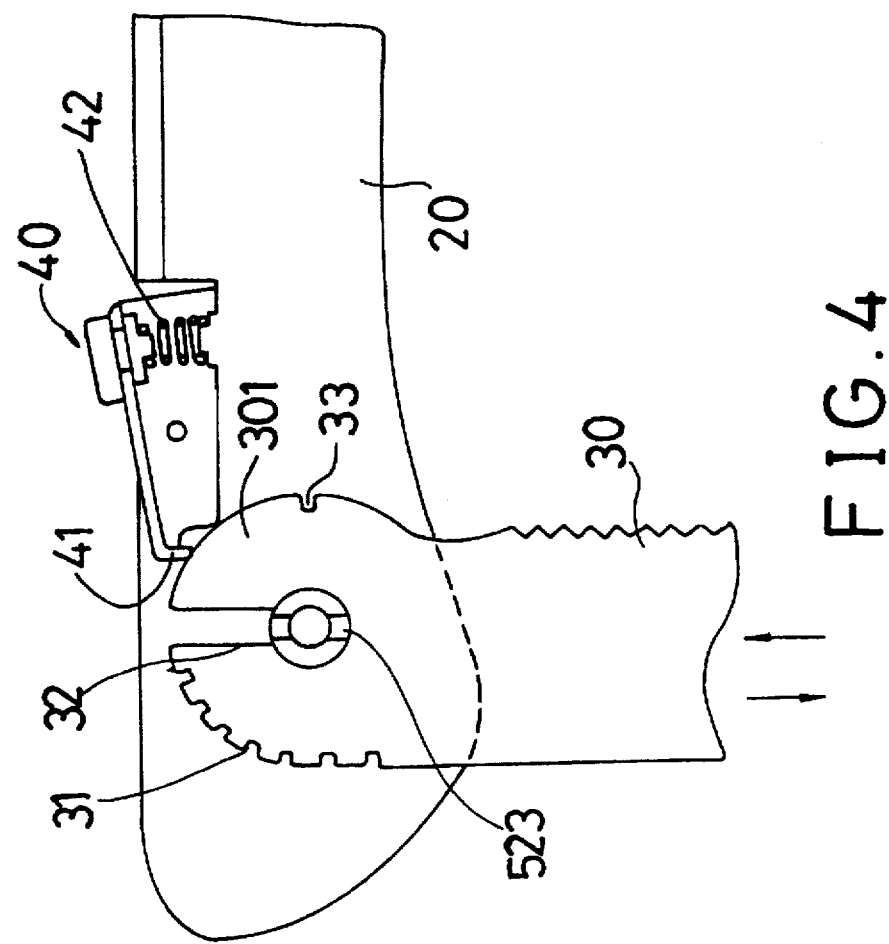
FIG. 4 is a schematic views illustrating the operation of the saw blade securing mechanism.
Figure 2:
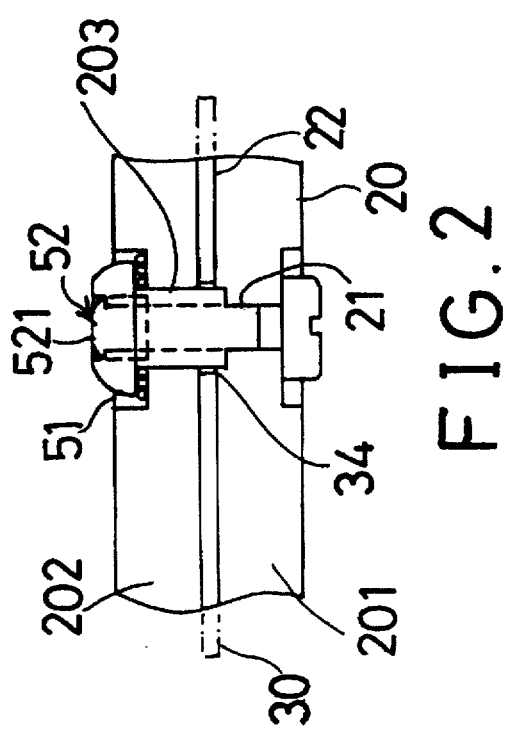
FIGS. 2 and 3 are schematic views illustrating the engaging operation of the saw blade to the handle.
Figure 3:
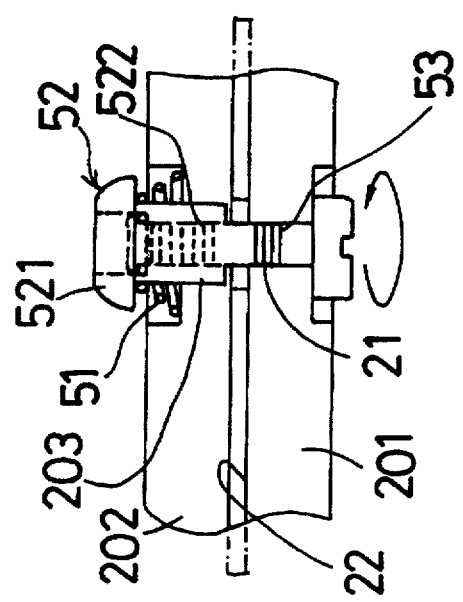

As shown in FIG. 3, when the bolt 53 is fully threaded into the rod 52, the projections 523 of the rod 52 are forced to be engaged in the oblong hole 21 such that the rod 52 is prevented from rotating relative to the handle 20 and such that the bolt 53 may be unthreaded relative to the rod 52. When it is required to engage and to disengage the saw blade 30 from the handle 20, as shown in FIGS. 3 and 4, it is required to unthread the bolt 53 relative to the rod 52 until the projections 523 of the rod 52 are disengaged from the oblong hole 21 and are engaged in the slot 22 of the handle 20 (FIG. 3). At this moment, the groove 32 of the saw blade 30 may be engaged through the projections 523 and the bolt 53 until the projections 523 are engaged in the aperture 34 such that the rod 52 may be engaged into the aperture 34 (FIG. 4) and such that the bolt 53 may be threaded relative to the rod 52 again so as to retain the rod 52 in the aperture 34. The saw blade 30 may thus be rotated about the rod 52 and will not be disengaged from the rod 52, such that a new saw blade 30 may be easily changed without fully unthreading the bolt 53 and the rod 52.

Figure 5:
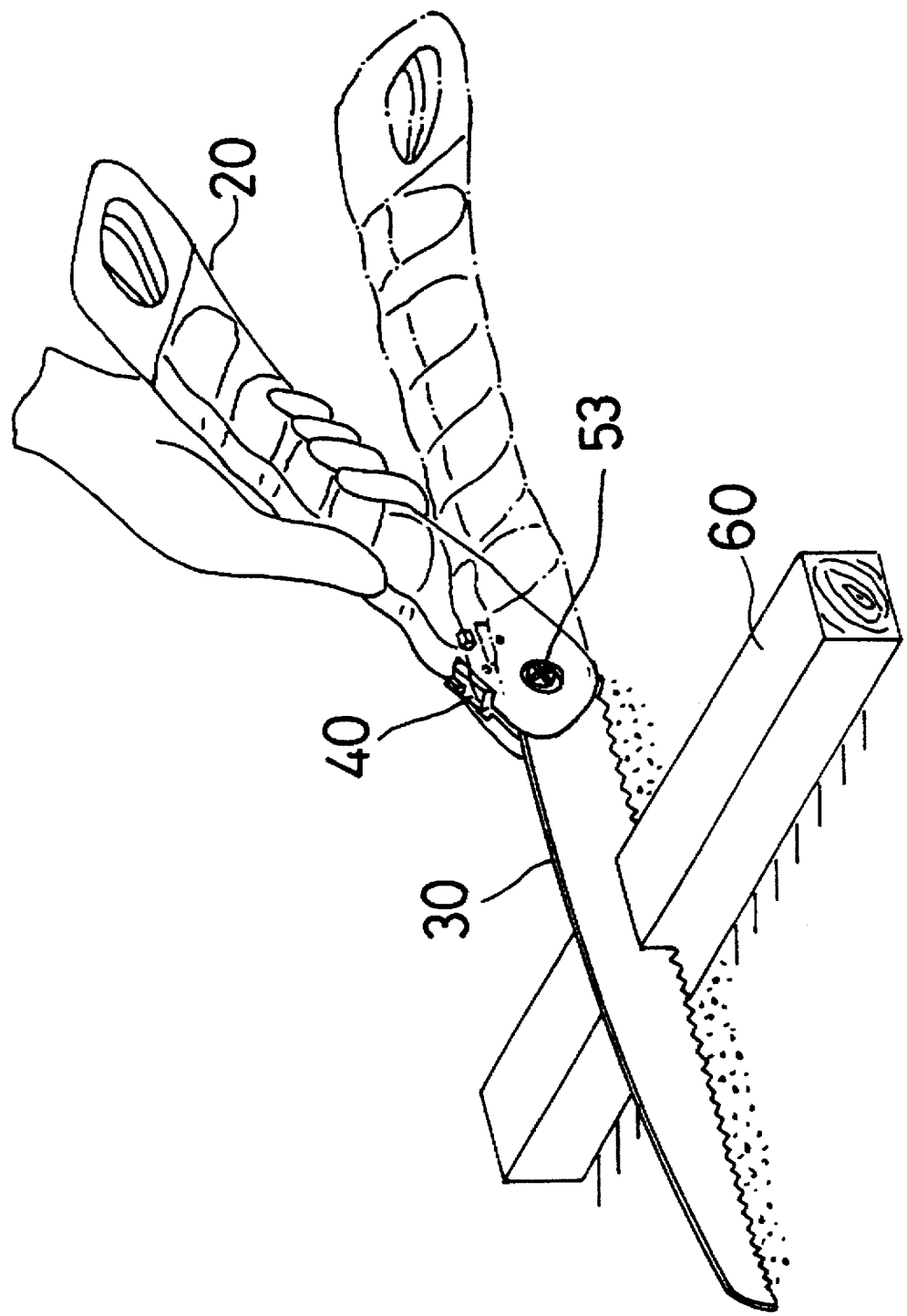
FIG. 5 is a perspective view illustrating the operation of the saw blade securing mechanism.
Figure 6:
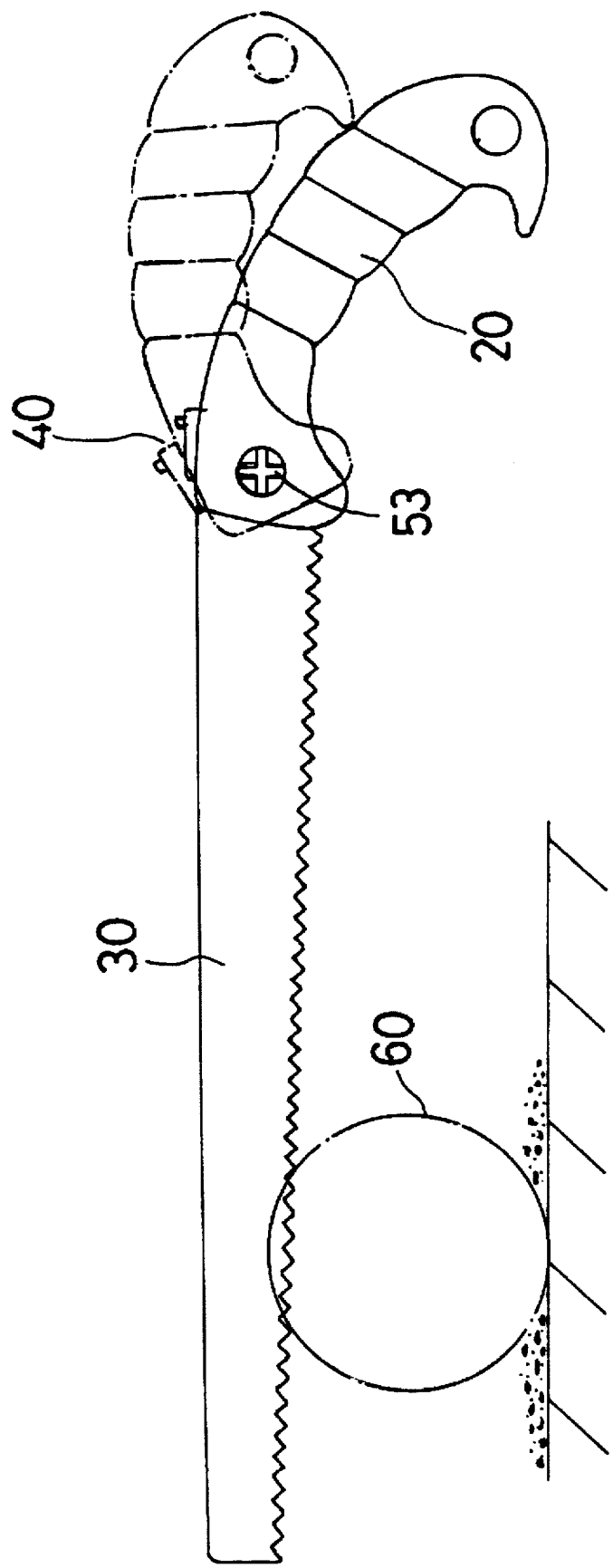
FIG. 6 is a plane view illustrating the operation of the saw blade securing mechanism.

When the latch 41 is biased to engage with either of the notches 31, the saw blade 30 may be adjusted to different angular position relative to the handle 20, best shown in FIGS. 5 and 6, such that the workpiece 60 directly disposed on the ground may also be easily sawed by the saw blade 30. When the saw blade 30 is rotated about the rod 52 until the the latch 41 of the knob 40 is engaged with the depression 33, the saw blade 30 may be maintained in the folded position.

Accordingly, the saw blade may be easily secured to the handle without disengaging the bolt from the handle. In addition, the saw blade may be adjusted to different angular position for allowing the saw blade to saw the workpiece directly disposed on the ground.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A saw comprising:

a handle including a first end having a slot formed therein and including an orifice formed therein and intersected with said slot, a rod rotatably engaged in said orifice of said handle and including a first end having a head formed thereon for engaging with said first end of said handle and including a second end having at least one projection extended therefrom, said projection including a size smaller than that of said rod, a saw blade including a first end having a groove formed therein for engaging with said projection when said projection is engaged in said slot, said groove including a root portion, said saw blade including an aperture formed in said root portion of said groove for engaging with said rod when said rod is aligned with said aperture, said aperture including a size greater than that of said groove so as to prevent said rod from disengaging from said saw blade when said rod is engaged in said aperture of said saw blade, and means for securing said rod to said handle so as to retain said rod in said aperture of said saw blade and so as to allow said saw blade to be rotated relative to said rod, said first end of said saw blade including a peripheral portion having at least two notches formed therein, said handle further including a latch means provided therein for engaging with said notches so as to secure said saw blade relative to said handle and so as to allow said saw blade to be adjusted to different angular position relative to said handle.

2. A saw according to claim 1, wherein said first end of said saw blade includes a depression formed therein opposite to said notches for engaging with said latch means so as to secure said saw blade relative to said handle when said saw blade is folded to engage with said handle.

3. A saw comprising:

a handle including a first end having a slot formed therein and including an orifice formed therein and intersected with said slot, a rod rotatably engaged in said orifice of said handle and including a first end having a head formed thereon for engaging with said first end of said handle and including a second end having at least one projection extended therefrom, said projection including a size smaller than that of said rod, a saw blade including a first end having a groove formed therein for engaging with said projection when said projection is engaged in said slot, said groove including a root portion, said saw blade including an aperture formed in said root portion of said groove for engaging with said rod when said rod is aligned with said aperture, said aperture including a size greater than that of said groove so as to prevent said rod from disengaging from said saw blade when said rod is engaged in said aperture of said saw blade, and means for securing said rod to said handle so as to retain said rod in said aperture of said saw blade and so as to allow said saw blade to be rotated relative to said rod, said first end of said handle including a pair of fins having said slot formed therebetween, said orifice being formed in a first of said fins, and a second of said fins including an oblong hole formed therein for engaging with said projection so as to prevent said rod from rotating relative to said handle.

4. A saw comprising:

a handle including a first end having a slot formed therein so as to define a first fin and a second fin, said first fin including an oblong hole formed therein, said second fin including an orifice formed therein, a rod rotatably engaged in said orifice of said second fin and including a first end having a head formed thereon for engaging with said second fin and including a second end having at least one projection extended therefrom for engaging with said oblong hole so as to prevent said rod from rotating relative to said handle, said projection including a size smaller than that of said rod, a saw blade including a first end having a groove formed therein for engaging with said projection when said projection is engaged in said slot, said groove including a root portion, said saw blade including an aperture formed in said root portion of said groove for engaging with said rod when said rod is aligned with said aperture, said aperture including a size greater than that of said groove so as to prevent said rod from disengaging from said saw blade when said rod is engaged in said aperture of said saw blade, and means for securing said rod to said handle so as to retain said rod in said aperture of said saw blade and so as to allow said saw blade to be rotated relative to said rod.

5. A saw according to claim 4, wherein said first end of said saw blade including a peripheral portion having at least two notches formed therein, said handle further includes a latch means provided therein for engaging with said notches so as to secure said saw blade relative to said handle and so as to allow said saw blade to be adjusted to different angular position relative to said handle.

6. A saw according to claim 5, wherein said first end of said saw blade includes a depression formed therein opposite to said notches for engaging with said latch means so as to secure said saw blade relative to said handle when said saw blade is folded to engage with said handle.

* * * * *